Patented Oct. 28, 1952

2,615,897

UNITED STATES PATENT OFFICE 2,615,897

HYDANTOINS CONTAINING BASIC SUBSTITUENTS

Walther Persch, Frankfort-on-the-Main-Hochst, and Adolf P. C. Schmidt, Frankfort-on-the-Main-Fechenheim, Germany, assignors to Cassella Farbwerke Mainkur, Frankfort-on-the-Main-Fechenheim, Germany No Drawing. Application November 15, 1949,
Serial No. 127,508

1 Claim. (Cl. 260—309.5)

Our present invention relates to hydantoins containing basic substituents.

These new compounds correspond to the general formula:

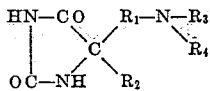

wherein $R_1$ means a bivalent radical containing alkyl groups which may be interrupted by oxygen and may be partially replaced by a phenylene group, $R_2$ means alkyl or phenyl, $R_3$ and $R_4$ mean alkyl groups, and wherein $R_1+R_2$ and/or $R_3+R_4$ may be connected to form a ring.

They are obtainable by the known processes for forming hydantoin rings, when a starting material containing basic substituents is used. They may be purified as sodium salts or as perchlorates. If several isomeric compounds are obtained, these isomers may be separated as hydrochlorides or, on account of the difference of their solubilities, in alcohol.

Our new compounds are all well soluble in alcohol, some of them in water too. Owing to the basic substituents, the acidic character of the hydantoin ring is weakened in these compounds. Their solutions show, therefore, a reaction nearer to the neutral point than the known hydantoins. In consequence of this reaction and of the radicals contained in the new compounds, they show a therapeutic action rendering them useful as medicines themselves or as intermediates for preparing other medicines.

The following examples and the table illustrate the invention more particularly, but they are not intended to limit the invention thereto; the parts are given by weight:

Example 1

96 parts of 1-N-piperidino-3-oxo-butane hydrochloride are dissolved in 120 ccm. alcohol and mixed with 34 parts of potash, 38 parts of potassium cyanide, 110 parts of ammonium bicarbonate and 350 parts of water. The mass is stirred in a closed vessel at 65–80° C. under a carbon dioxide pressure of 14–16 atmospheres for about 8 hours. Then the vessel is opened, and the crystals found therein are separated from the mother liquor by suction. When the liquid is concentrated in vacuo under carbon dioxide, a further quantity of crystals precipitates. All these crystals are recrystallized from methanol. The pure product represents 5-[2'-piperidinoethyl]-5-methyl-hydantoin of the formula:

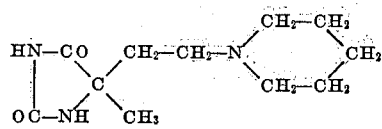

It melts at 202–203° C., and its solubility in water at room temperature is 3.4%.

Example 2

54 parts of 1-N-piperidino-3-oxo-4-dimethyl-pentane is dissolved in 250 parts of alcohol and mixed with 35 parts of potassium cyanide, 70 parts of ammonium carbonate and 250 parts of water. The mass is stirred at 50–55° C. under a reflux condenser and gradually heated to boiling, until after about 8 hours the evolution of carbon dioxide ceases. By further processing the reaction mass as described in Example 1, the 5-[2'-piperidino-ethyl]-5-tert.butyl-hydantoin of the formula:

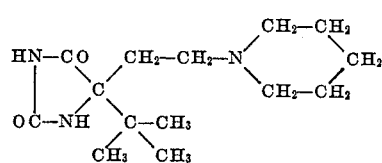

is obtained. It represents, when recrystallized from methanol, colorless needles melting at 246.5–247.5° C. Its solubility in water at 20° C. is 0.43%.

Example 3

58 parts of 1-dimethylamino-3-oxo-butane, 200 parts of alcohol, 38 parts of potassium cyanide, 100 parts of ammonium carbonate and 350 parts of water are heated in an autoclave under carbon dioxide pressure of 18–24 atmospheres to 70–80° C. for 11 hours. Then the mass is processed as described in Example 1. In this way 5(2'-dimethylaminoethyl)-5-methylhydantoin of the formula

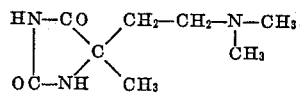

is obtained which melts when recrystallized from methanol at 181–182° C. Its solubility in water at room temperature is 15.5%.

In the following table some more representatives of the compounds of our invention are named:

| No. | Name of the compound | Melting point, °C. | Solubility in water at 20° C. |
|---|---|---|---|
| | | | Percent |
| 1a | 5-(β-dimethylamino-isopropyl)-5-ethylhydantoin. | 194 | 2.6 |
| 1b | 5-(β-dimethylamino-isopropyl)-5-ethylhydantoin(isomer). | 153-156 | >13 |
| 2 | 5-o-(β-diethylaminoethoxy-phenyl)-5-ethylhydantoin. | 195 | 0.16 |
| 3 | 5-o-(piperidinomethyl)-cyclo-hexylhydantoin. | 204-206 | 0.41 |
| 4a | 5-(β-piperidino-isopropyl)-5-methylhydantoin | 234-235 | 0.42 |
| 4b | 5-(β-piperidino-isopropyl)-5-methylhydantoin (isomer). | 196-198 | 1.58 |
| 5 | 5-o-(diethylaminomethyl)-cyclo-hexylhydantoin. | 189-190 | |
| 6 | 5-(β-piperidino-ethyl)-5-allyl-methylhydantoin. | 177-178 | 1.25 |
| 7 | 5-phenyl-5-(β-piperidino-ethyl)-hydantoin. | 189 | 0.29 |
| 8 | 5-p-(β-diethylamino-ethoxy-phenyl)-5-methyl-hydantoin. | 167-169.5 | 0.19 |
| 9 | 5-p-(β-diethylamino-ethoxy-phenyl)-5-ethyl-hydantoin. | 162.5-163 | 0.63 |
| 10 | 5-p-(β-diethylamino-ethoxy-phenyl)-5-propyl-hydantoin. | 153-154 | 0.19 |
| 11 | 5-o-(β-diethylamino-ethoxy-phenyl)-5-methyl-hydantoin. | 181.5-182.5 | 0.34 |
| 12 | 5-o-(β-diethylamino-ethoxy-phenyl)-5-propyl-hydantoin. | 156 | 0.096 |

We claim:

As new compounds the hydantoins containing basic substituents and corresponding to the general formula:

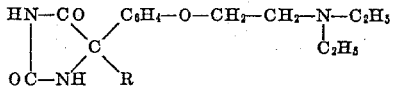

wherein R means a lower alkyl group, these compounds being colorless substances having definite melting points and being well soluble in alcohol.

WALTHER PERSCH.
ADOLF P. CH. SCHMIDT.

REFERENCES CITED

The following references are of record in the file of this patent:

UNITED STATES PATENTS

| Number | Name | Date |
|---|---|---|
| 2,290,281 | Henze | July 21, 1942 |

OTHER REFERENCES

Magee et al.: Jr. Am. Chem. Soc., vol. 60, pp. 2148-2151 (1938).

Magee et al.: Jr. Am. Chem. Soc., vol. 62, pp. 912-913 (1940).

Henze et al.: Jr. Am. Chem. Soc., vol. 63, pp. 1943-1945 (1941).